United States Patent [19]

Winkler et al.

[11] Patent Number: 5,351,099
[45] Date of Patent: Sep. 27, 1994

[54] NOSE PAD SUPPORT ARM FOR EYEGLASSES

[75] Inventors: Rolf Winkler, Eisingen; Bruno Herter, Konigsbach; Manfred Kappler, Pforzheim, all of Fed. Rep. of Germany

[73] Assignee: Frey & Windler GmbH & Co., Konigbach-Stein, Fed. Rep. of Germany

[21] Appl. No.: 921,741

[22] Filed: Jul. 30, 1992

[30] Foreign Application Priority Data

Feb. 27, 1992 [DE] Fed. Rep. of Germany ....... 4206018

[51] Int. Cl.⁵ .............................................. G02C 5/12
[52] U.S. Cl. ........................... 351/137; 351/71; 351/76; 351/88
[58] Field of Search ................. 351/68, 69, 70-82, 351/88, 103, 114, 124, 126, 128, 129, 131-139

[56] References Cited

U.S. PATENT DOCUMENTS

| | | | |
|---|---|---|---|
| 238,985 | 3/1881 | Terstegen | 351/71 |
| 588,723 | 8/1897 | Ward | 351/71 |
| 746,341 | 12/1903 | Kleb | 351/77 |
| 887,903 | 5/1908 | Adt | 351/71 |
| 967,292 | 8/1910 | Adt | 351/68 |
| 1,550,572 | 8/1925 | Sangren | 351/71 |
| 1,910,456 | 5/1933 | Baker | 351/137 |
| 2,135,800 | 11/1938 | Davignon | 351/114 |
| 3,431,045 | 3/1969 | Dietrich . | |

FOREIGN PATENT DOCUMENTS

| | | | |
|---|---|---|---|
| 147956 | 7/1950 | Australia | 351/103 |
| 46234 | 2/1911 | Austria | 351/136 |
| 63201 | 8/1913 | Austria | 351/136 |
| 0191887 | 8/1986 | European Pat. Off. . | |
| 0456048 | 11/1991 | European Pat. Off. . | |
| 3912600 | 11/1989 | Fed. Rep. of Germany . | |
| 586289 | 3/1925 | France | 351/71 |
| 2473735 | 7/1981 | France . | |
| 2515831 | 5/1983 | France | 351/114 |
| 2640767 | 6/1990 | France . | |
| 368917 | 3/1991 | Japan . | |
| 107306 | 6/1917 | United Kingdom | 351/71 |
| 215289 | 5/1924 | United Kingdom | 351/139 |
| 461401 | 2/1937 | United Kingdom | 351/136 |
| 1133205 | 11/1968 | United Kingdom . | |
| 2110417 | 6/1983 | United Kingdom . | |

*Primary Examiner*—Ricky D. Shafer
*Attorney, Agent, or Firm*—Spensley Horn Jubas & Lubitz

[57] ABSTRACT

A support arm with a holder for a bearing element such as a nose pad for fastening the holder to a respective frame of eyeglasses. The support arm is constituted, along at least a portion of its length, by a core of hard material and inner and an outer layer of wires wound spirally as a jacket around the core. Because of this combination of materials, the support arm has both adequate stability in the normal position when the glasses are worn by the glasses wearer and also flexible resiliency and ensuing restoration of the normal position in the event of an external strain such as an impact, without permanent deformation of the support arm.

11 Claims, 1 Drawing Sheet

NOSE PAD SUPPORT ARM FOR EYEGLASSES

FIELD OF THE INVENTION

The invention relates to a nose pad support arm with a holder for a bearing element, such as a nose pad, for securing the pad to the frame of a pair of eyeglasses.

BACKGROUND OF THE INVENTION

For fastening and joining bearing elements, particularly nose pads, to the frame of glasses, a common practice is to provide thin, suitably bent lengths of wire that have a hardness of 120 to 200 DPN (Vickers diamond pyramid hardness number), each wire being soldered on one end to the frame around one lens and on the other being fastened to a holder or other receptacle for connection to a bearing element, such as a nose pad. The construction of this kind of holder, in terms of its shape and operation, is intrinsically determined by the type of bearing element, and a number of designs are known.

The rigidity of each wire makes the support arms practically inflexible, so the optician must adapt them to the anatomical characteristics of the area of the glasses wearer's nose which is to be contacted by each nose pad. Because of the rigidity of the wires, they, and the nose pads, then remain in the position set by the optician. In this position, hereinafter called the normal position, the applicable weight components of the glasses frame are then transmitted to the sides of the nose, via the support arms and the nose pads.

However, situations do exist in which the rigidity of the support arms, however desirable it may be for the sake of basic stability, is nevertheless a great disadvantage; not only are the support arms unable to adapt to anatomical changes, but they also have an unsatisfactory effect if a sudden, pulse-like pressure is exerted on the glasses, such as if a ball hits the glasses during athletic activity. In that case, the support arm, because of its rigidity, will not yield until a certain pressure level is reached; this may be quite painful for the glasses wearer, because all the external force exerted is then transmitted, substantially unattenuated, to the sides of the nose via the nose pads.

Given the relatively small bearing area of the nose pads, and if the incident force is in such a direction as to cause possible harm, the result will at least be severe pain to the glasses wearer, and possibly even skin injuries.

If the severity of such a sudden strain exceeds a certain limit value, the support arm bends; in that case, although some of the arriving energy is absorbed by the bending of the support arm, nevertheless the arm then remains in the deformed, bent position; the glasses are no longer correctly seated and must be readjusted by the optician, and sometimes the deformation is so great that this is no longer possible.

SUMMARY OF THE INVENTION

It is therefore an object of the invention to provide an improved support arm in combination with a nose pad which is adaptable to changing external conditions, whatever their source.

Another object of the invention is to provide a support arm which presents a unique combination of structural stability and resilience such that it maintains a preset configuration in normal use and yet is highly yieldable to absorb deformation forces applied to the eyeglasses.

According to the invention, the above and other objects are attained in that over at least part of its length, but preferably over its entire length, each support arm comprises a core of hard material and at least one outer layer of wires wound as a jacket spirally around the core, and that the material properties of the core and jacket are adapted to one another such that a reversible spring behavior as a function of any external strain is established.

More specifically, the material properties of the core and jacket are selected such that in the normal position, in other words with a normal load on the support arm by the applicable weight components of the glasses frame, a predominantly rigid behavior results in reliable transmission of these weight components to the sides of the nose; the rims of the glasses, in particular, remain at the proper distance, set by the optician, from the bearing surfaces of the nose pads on the sides of the nose. The reversible spring behavior that is established in the event of greater strains means that in the case of forceful strains on the support arm, for instance from a blow or impact on the glasses frame, the support arm makes a certain spring deflection distance available that at least partially absorbs the energy of the impact, so that only some of this force of the strain is transmitted to the sides of the glasses wearer's nose, so as to avert or at least greatly reduce any action which might otherwise be so severe as to threaten injury.

The reversibility of the spring behavior means that once the external force imposed upon the glasses is withdrawn, the support arm springs back to its original normal position, as set by the optician, and thus the glasses frame also returns to the normal position in front of the wearer's eyes, as adjusted, so that the glasses lenses will have the proper optical effect.

A suitable material to create such an arm according to the invention proves to be a commercially available netting wire, in which two layers of wire are wound in mutually opposite sense around a metal wire core. The support arm behavior described above can be achieved by dimensioning these components of a netting wire substantially so that the core has a dimension in which it essentially predetermines the desired form of the support arm, such as a U shape, in its normal position under the strain of only the weight components of the eyeglasses frame, while contrarily the spirally wound wires can be dimensioned in terms of their thickness such that they essentially achieve the spring action, in other words the restorative capacity of the support arm from the position of maximum strain back to its normal position, which the metal core, as described at the outset above, would not be capable of achieving on its own.

With suitable selection of the material properties, a progressive spring behavior can also be achieved; that is, with increasing bending of the support arm, a disproportionately larger deformation force would be necessary to effect further bending. In practice, this means that by means of a spring characteristic adjusted in this way, even very strong, pulsed external forces on the available deformation path of the support arm, which as a rule is only a few millimeters long, can be absorbed or "annihilated" so that the sides of the glasses wearer's nose remain protected.

Advantageous embodiments of the invention are described below. An exemplary embodiment of the support arm according to the invention is described in further detail below with reference to the drawings.

DESCRIPTION OF THE PREFERRED EMBODIMENTS

Figure 2:
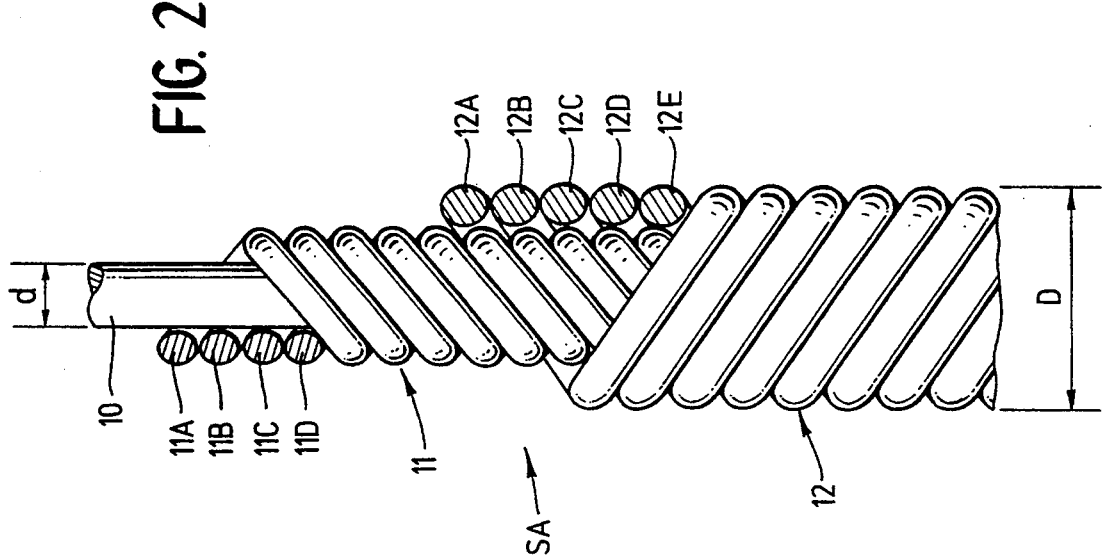
FIG. 2 is a detail view, which is partly cut-away and is to a larger scale than FIG. 1, of the structure of the support arm of FIG. 1.
Figure 1:
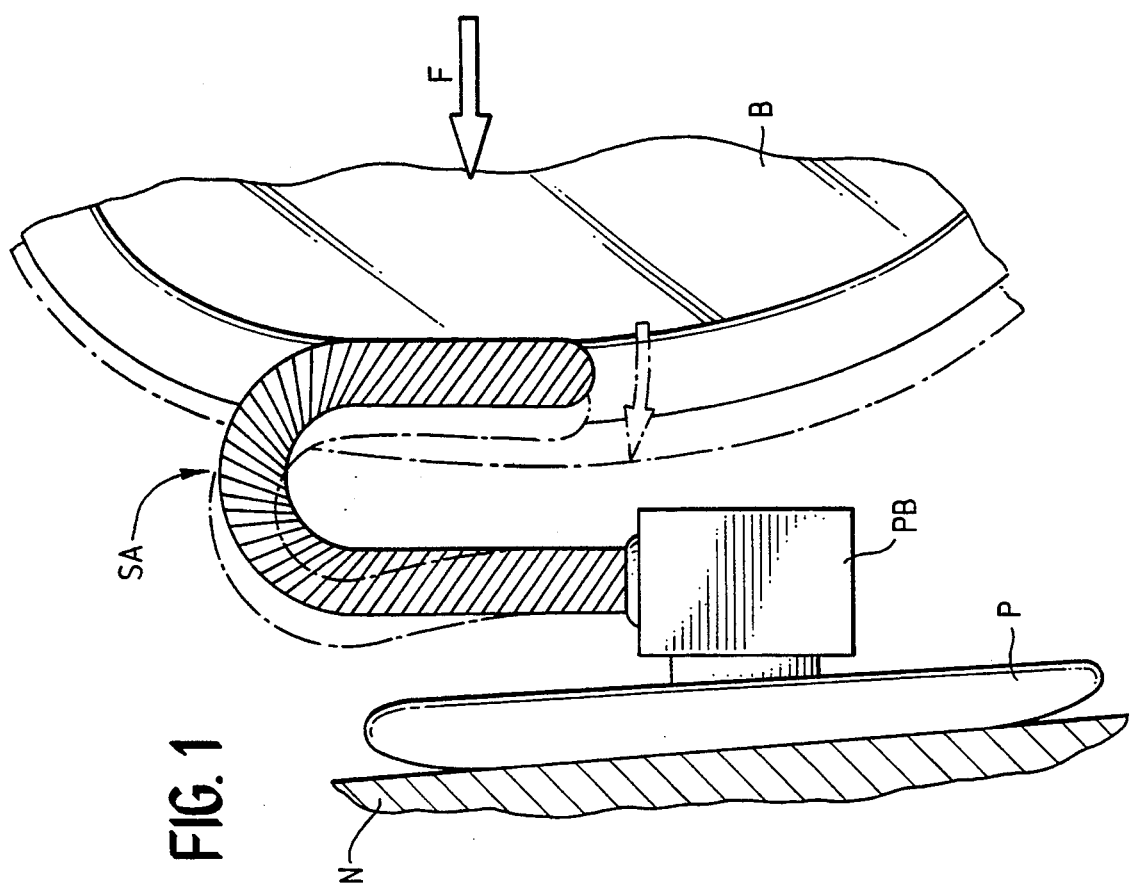
FIG. 1 is a detail view of a portion of a pair of eyeglasses provided with a preferred embodiment of a support arm according to the invention in its intended position between a lens frame and the side of the wearer's nose.

In FIG. 1, a support arm SA serves in the conventional way to join the edge of a rim, or frame, B around a lens of a pair of eyeglasses to a bearing element, or nose pad, P, for instance, that rests on the side N of the nose of the glasses wearer. In the exemplary embodiment shown, the support arm SA is soldered for this purpose both to the rim or frame B of the glasses and to a holder, or pad box, PB, which movably receives, in a conventional manner, anchoring fins of a metal inlay in the pad P.

The support arm SA has the form of tube, or shaft, composed of a longitudinal inner core, or armature, 10 of metal, around which an inner layer 11 composed of four parallel-extending metal wires 11A, 11B, 11C, 11D is spirally wound in a first direction, and an outer layer 12 composed of five parallel-extending metal wires 12A, 12B, 12C, 12D, 12E, is wound in the opposite direction. Preferably, the wires in each wound layer are arranged side-by-side in contact with one another.

According to an exemplary embodiment, the diameter d of wire core 10 is approximately 0.5 mm, the diameter of each of the wires 11A, B, C, D of inner layer 11 is 0.25 mm, and the diameter of each of wires 12A, B, C, D, E of outer layer 12 is 0.30 mm, making the total diameter D of bridge arm SA 1.6 mm. A feature of special significance is that the core 10 initially defines the basic shape of support arm SA, in the exemplary embodiment that of a U, in its normal position (FIG. 1), and that the inner layer 11 and outer layer 12 extend over the entire length of the support arm SA.

This structure guarantees the highly elastic spring action described above; that is, upon the imposition of an external force F, as indicated for instance by the arrow in FIG. 1, upon the glasses frame B, the entire length of the support arm, both in its curving region and in its straight regions, participates in bending of support arm SA out of the normal position into the "strain position" shown in dashed lines in FIG. 1 and is thus available to absorb strain forces. The cooperation of the play of forces between core 10 on the one hand and wire windings 11 and 12 on the other, makes it simultaneously possible, in an unexpected manner, to meet the basic demands of adequate stability in the normal position — that is, flexible resiliency when subjected external strain — and restoration of the normal position when the strain is removed.

It will be understood that the various individual components of the support arm perform various functions which in their total action add up to the especially advantageous overall behavior sought.

Core 10 and wires 11 and 12 are made of a metal which may be selected, on the basis of their desired properties, according to principles known in the metallurgical art. Core 10 is preferably made of a spring steel and wires 11 and 12 are preferably made of an alloy known as nickel silver, or German silver.

One example for such an alloy is:

According to DIN spring steel X5CrNiMo 1810 for core 10 and according to DIN nickel silver CuNi18Zn20 for wires 11 and 12.

This application relates to subject matter disclosed in German Application number P 42 06 018.4, filed on Feb. 27, 1992, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. In a pair of eyeglasses having frames, two nose pads, and two holders each holding a respective nose pad, the improvement comprising a nose pad support arm for supporting each holder, said support arm having two opposed ends, with one opposed end connected to a respective frame of the eyeglasses and the other opposed end connected to a respective one of the holders, wherein said support arm has a length, between said two opposed ends, and comprises, over at least part of its length, a core of a hard material and a jacket composed of at least two layers of metal wires or bands wound spirally around said core, said core and said wires or bands each being made of a material such that said support arm is resiliently deformable in response to external strains imposed on the frame, and further wherein said jacket comprises an inner wound layer of metal wires or bands wound around said core and an outer wound layer of metal wires or bands wound around said inner wound layer, said metal wires or bands of each of said layers being disposed parallel to, and in contact with, one another and said outer wound layer being wound around said core in an opposite winding sense from said inner wound layer.

2. The eyeglasses of claim 1, wherein each said wound layer is composed of metal wires having a diameter of 0.2 to 0.5 mm.

3. The eyeglasses of claim 2, wherein each said metal wire consists of nickel silver.

4. The eyeglasses of claim 1, wherein each said wound layer is composed of 3 to 6 metal wires.

5. The eyeglasses of claim 1, wherein said core consists of a spring wire with a diameter of 0.5 mm, said inner wound layer consists of four metal wires each with a diameter of 0.25 mm and said outer wound layer consists of five metal wires each with a diameter of 0.30 mm.

6. The eyeglasses of claim 5, wherein said core consists of spring steel and each wire of each said wound layer consists of nickel silver.

7. The eyeglasses of claim 1 wherein said core consists of a metal wire having a diameter of 0.2 to 0.6 mm.

8. The eyeglasses of claim 1 wherein said metal wire of said core consists of spring steel.

9. In a pair of eyeglasses having frames, two nose pads, and two holders each holding a respective nose pad, the improvement comprising a nose pad support arm for supporting each holder, said support arm having two opposed ends, with one opposed end connected to a respective frame of the eyeglasses and the other opposed end connected to a respective one of the holders, wherein said support arm has a length, between said two opposed ends, a core of a hard material and a jacket composed of at least two layers of metal wires or bands wound spirally around said core, said core and said wires or bands each being made of a material such that said support arm is resiliently deformable in response to external strains imposed on the frame, and said jacket and core extend along the entire length of said support arm, and further wherein said jacket comprises an inner wound layer of metal wires or bands wound around said core and an outer wound layer of metal wires or bands wound around said inner wound layer said metal wires or bands of each of said layers being disposed parallel to, and in contact with, one another and said outer wound layer being wound around said core in an opposite winding sense from said inner wound layer.

10. The eyeglasses of claim 9, wherein said core consists of a metal wire having a diameter of 0.2 to 0.6 mm.

11. The eyeglasses of claim 10, wherein said metal wire of said core consists of spring steel.

* * * * *